United States Patent [19]

Reber et al.

[11] Patent Number: 5,594,935

[45] Date of Patent: Jan. 14, 1997

[54] INTERACTIVE IMAGE DISPLAY SYSTEM OF WIDE ANGLE IMAGES COMPRISING AN ACCOUNTING SYSTEM

[75] Inventors: William L. Reber, Schaumburg, Ill.; Cary D. Perttunen, Shelby Township, Mich.

[73] Assignee: Motorola, Inc., Schaumburg, Ill.

[21] Appl. No.: 440,015

[22] Filed: May 12, 1995

Related U.S. Application Data

[63] Continuation-in-part of Ser. No. 392,705, Feb. 23, 1995, and a continuation-in-part of Ser. No. 392,593, Feb. 23, 1995, and a continuation-in-part of Ser. No. 431,185, Apr. 28, 1995.

[51] Int. Cl.$^6$ ........................................ H04N 7/16
[52] U.S. Cl. ............................ 455/2; 455/4.2; 455/5.1; 348/1; 348/13; 348/36; 348/61
[58] Field of Search ........................... 455/2, 3.1, 4.2, 455/5.1, 6.3; 348/1, 3, 6, 7, 12, 13, 36, 37, 38, 39, 239, 555, 556, 553, 61, 63, 81, 117, 123; 358/84, 86; H04N 7/173, 7/16

[56] References Cited

U.S. PATENT DOCUMENTS

| | | | |
|---|---|---|---|
| 4,173,024 | 10/1979 | Miller | 348/7 |
| 4,528,589 | 7/1985 | Block et al. | 348/10 |
| 4,667,802 | 5/1987 | Verduin et al. | 348/7 |
| 4,916,737 | 4/1990 | Chomet et al. | 348/3 |
| 5,185,667 | 2/1993 | Zimmermann | 358/209 |
| 5,280,540 | 1/1994 | Addeo et al. | 379/54 |
| 5,289,271 | 2/1994 | Watson | 455/2 |
| 5,341,474 | 8/1994 | Gelman et al. | 348/12 |
| 5,367,329 | 11/1994 | Nakagaki et al. | 348/1 |
| 5,384,588 | 1/1995 | Martin et al. | 348/36 |
| 5,432,871 | 7/1995 | Novik | 382/232 |

OTHER PUBLICATIONS

"Peering Out a 'Real Time' Window" by Peter H. Lewis, The New York Times, Wednesday, Feb. 8, 1995.

*Primary Examiner*—Victor R. Kostak
*Assistant Examiner*—Chris Grant
*Attorney, Agent, or Firm*—Bruce E. Stuckman

[57] ABSTRACT

An interactive image display system includes a user interface to select a portion of a wide-angle image sequence. An image processor processes the portion of the wide-angle image sequence selected by the user interface to produce a perspective corrected image sequence. A display device displays the perspective corrected image sequence produced by the image processor. An accounting system monitors a usage parameter associated with the interactive image display system. A controller selectively inhibits an operative feature provided by at least one of the user interface, the image processor, and the display device based upon the usage parameter.

15 Claims, 2 Drawing Sheets

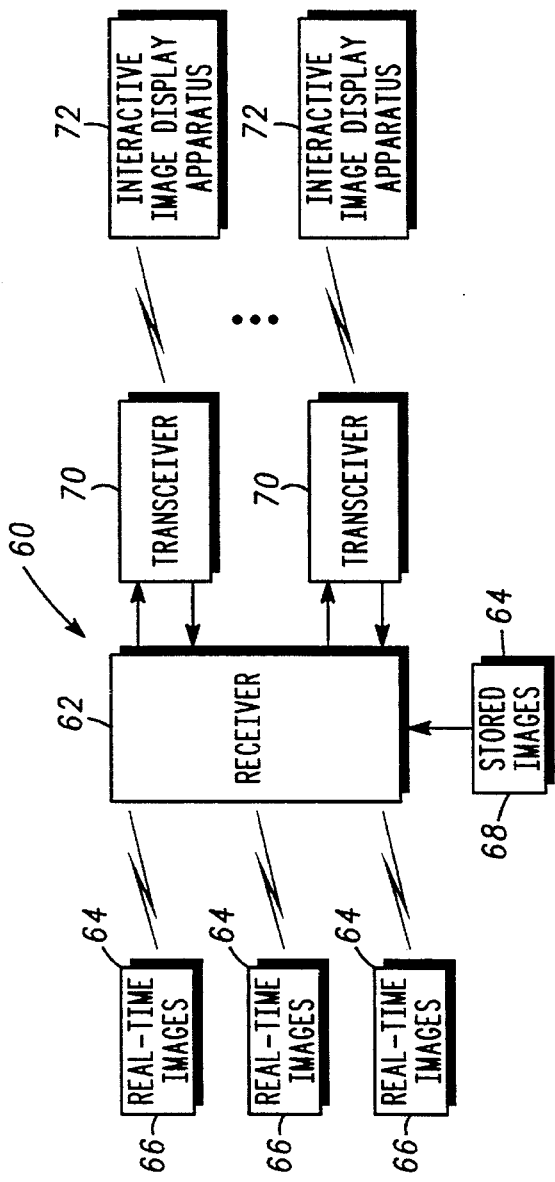
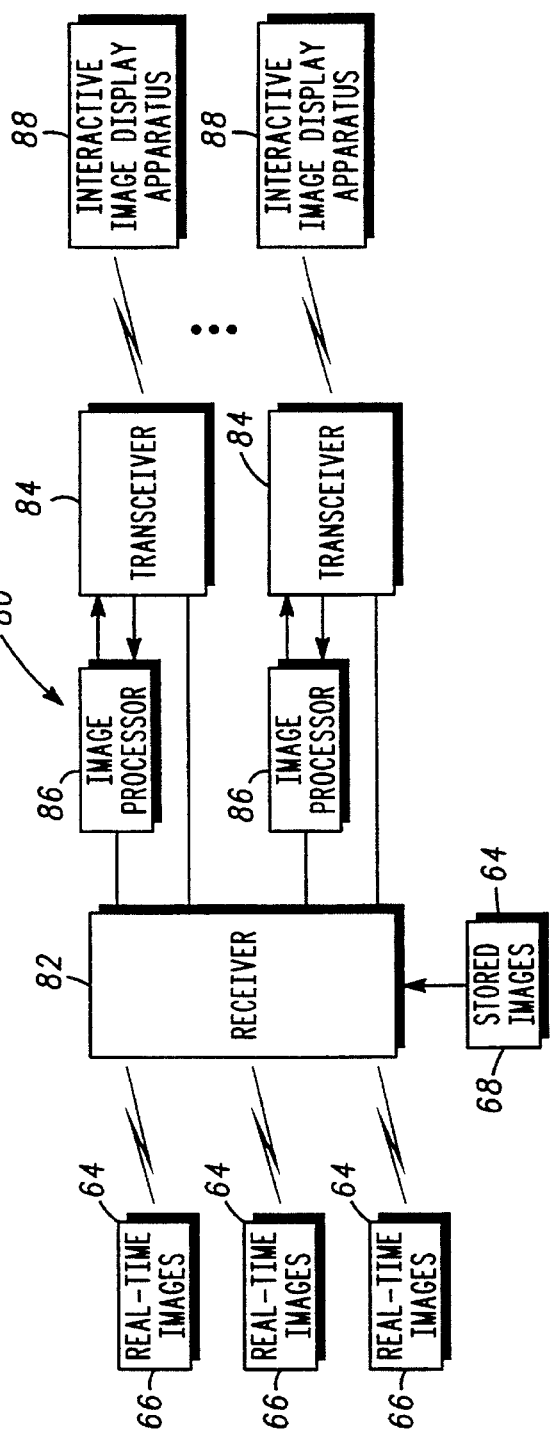

INTERACTIVE IMAGE DISPLAY SYSTEM OF WIDE ANGLE IMAGES COMPRISING AN ACCOUNTING SYSTEM

CROSS REFERENCE TO RELATED APPLICATIONS

The present application is a continuation-in-part of the following applications which are assigned to the same assignee as the present application:

(1) "Method and System for Interactively Viewing a Broadcast Program", having Ser. No. 08/392,705, filed Feb. 23, 1995; and (2) "Method and System for Broadcasting an Interactively Viewable Program", having Ser. No. 08/392,593, filed Feb. 23, 1995; and (3) "Method and System for Producing an Animated Image Sequence using Wide-Angle Images", having Serial No. 08/431,185, filed Mar. 28, 1995.

The subject matter of the above-identified applications is incorporated by reference hereby into the disclosure of this invention.

FIELD OF THE INVENTION

The present invention relates to methods and systems for interactively viewing an image sequence.

BACKGROUND OF THE INVENTION

There are various known types of interactive viewing receivers, such as a Broadcast videotex receiver and an Interactive Videotex receiver, which are equipped with a user interface to facilitate interactive viewing of transmitted signals. Broadcast Videotex utilizes a one-way transmission of textual data from a program source to each of a plurality of receivers. Interactive Videotex allows each viewer to transmit one or more signals to the program source to select the textual data being transmitted to the receivers.

Some interactive viewing receivers are available for use with interactive cable television systems. Here, each viewer interacts with a program source by providing and/or requesting various types of information over a cable television distribution network. These interactive viewing receivers are typically located within the viewer's residence to provide services such as video-on-demand and home-shopping.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 3 is a block diagram of an embodiment of a distribution system for use with embodiments of the interactive image display system; and FIG. 4 is a block diagram of an alternative embodiment of an image distribution system for use with embodiments of the interactive image display system.

DETAILED DESCRIPTION OF A PREFERRED EMBODIMENT

Embodiments of the present invention advantageously provide an interactive image display apparatus having the form of a kiosk which can be utilized at public locations. The interactive image display apparatus allows a user to select a portion of a wide-angle view of live, real-world environment. The portion is transformed in real-time to display a perspective corrected image sequence to provide the user a telepresence within the environment. Further, the user is capable of viewing performance animation using an animated image sequence generator.

Figure 1:
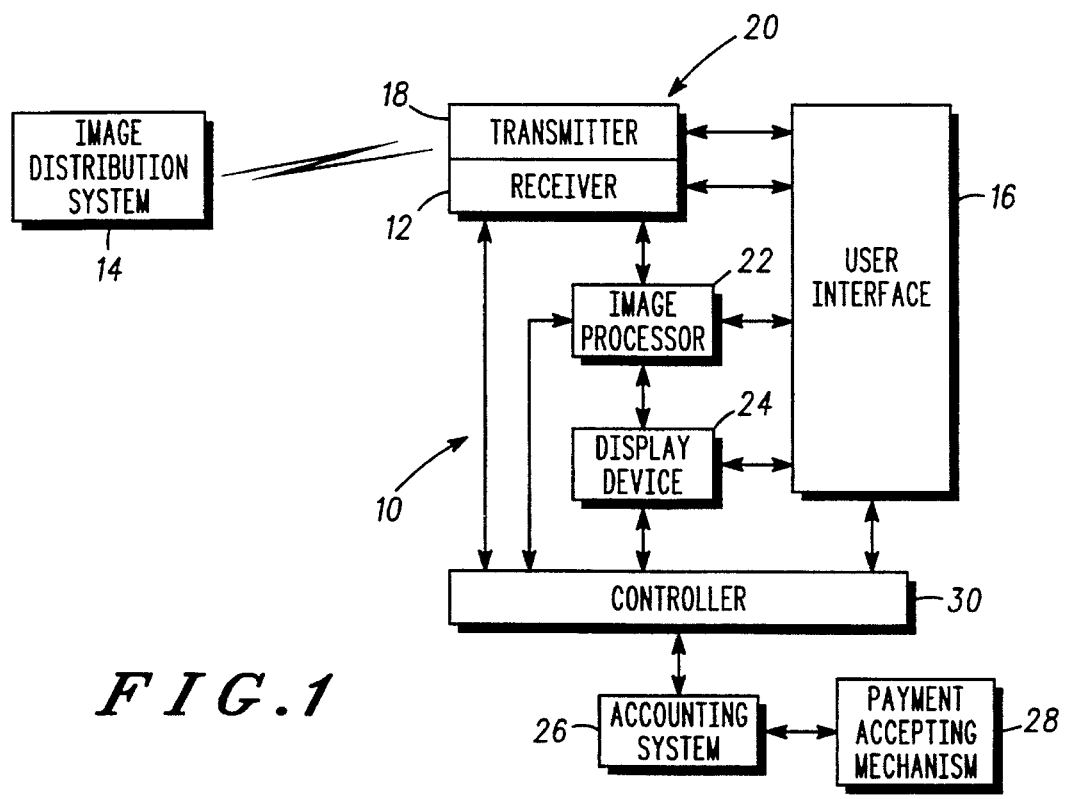
FIG. 1 is a block diagram of an embodiment of an interactive image display system.

FIG. 1 is a block diagram of an embodiment of an interactive image display system 10. The interactive image display system 10 includes a receiver 12 which receives a wide-angle image sequence from an image distribution system 14 located remotely therefrom. Typically, the receiver 12 receives a signal representative of the wide-angle image sequence in either a digital or analog form. The signal can be received via an over-the-air transmission, a cable transmission, a direct broadcast satellite transmission, or a transmission via a digital telephone carrier.

The image distribution system 14 can be embodied by any of the broadcast systems disclosed in the copending application "Method and System for Broadcasting an Interactively Viewable Program". Alternatively, the image distribution system 14 can be embodied by a narrowcast or single-cast system as described herein.

The interactive image display system 10 further includes a user interface 16 to select a portion of the wide-angle image sequence. In selecting the portion of the wide-angle image sequence, the user interface 16 can be utilized to perform a step of selecting a viewing angle and/or a step of selecting a magnification for a perspective corrected view which is to be produced.

The user interface 16 can also be utilized to select the wide-angle image sequence from a plurality of wide-angle image sequences. In this case, all of the plurality of wide-angle image sequences can be transmitted by the image distribution system 14 for selective reception by the receiver 12 as commanded by the user interface 16. Alternatively, the interactive image display system 10 can further include a transmitter 18 to transmit one or more selection signals to the image distribution system 14. The transmitter 18 and the receiver 12 form a transceiver 20, which is operatively associated with the user interface 16, and is used for two-way communication between the interactive image display system 10 and the image distribution system 14. Here, the transceiver 20 is operative to transmit a first selection signal indicative of a selected wide-angle image sequence to the image distribution system 14, and to receive a signal representative of the selected wide-angle image sequence.

The user interface 16 includes an input device such as one or more buttons, a keyboard, a mouse, a joystick, a lightpen, a trackball, a touchpad, or a touchscreen, to permit a user to select the wide-angle image sequence from the plurality of wide-angle image sequences, and to select the portion of the wide-angle image sequence. Preferably, the user interface 16 includes a graphical user interface capable of displaying icons and allowing the user to make selections using a combination of point, click, and/or drag operations with a mouse or a like input device.

The interactive image display system 10 further includes an image processor 22 operatively associated with the user interface 16 and the transceiver 20. The image processor 22 processes the portion of the wide-angle image sequence selected using the user interface 16 to produce an image signal representative of a perspective corrected image sequence. In a preferred embodiment, the image processor 22 includes a system for electronically transforming the portion of the wide-angle image sequence as disclosed in U.S. Pat. No. 5,185,667 to Zimmermann ("the Zimmermann patent"), which is hereby incorporated by reference. Here, the image processor 22 transforms a digitized representation of the portion using a real-time image transform processor. Other transformations can be performed either spatially by the distribution of sensing elements on an imaging sensor or through alternative computation means such as using a ray-imaging process.

A display device 24 displays the perspective corrected image sequence based upon the image signal produced by the image processor 22. The display device 24 can include a cathode ray tube or a liquid crystal display, for example, to provide the display. In alternative embodiments, the image transformation can be performed directly using the display device 24. Here, the display device 24 has a non-uniform pixel density to directly transform the portion into the perspective corrected image sequence.

The interactive image display system 10 includes an accounting system 26 which monitors a usage parameter thereof. The usage parameter can be a measure of the time elapsed during a session, a measure of computational resources utilized during the session, and/or a measure of information communicated with the distribution system during the session, for example. In a preferred embodiment, the accounting system 26 is embodied by a microprocessor (not specifically illustrated) which executes a series of programmed steps stored in a memory (not specifically illustrated).

Preferably, the accounting system 26 is also utilized to monitor a payment parameter provided thereto. The payment parameter is representative of an amount of usage which is purchased by the user. The payment parameter can be representative of an amount of money, a number of sessions, or a session length representative of the amount of usage which is purchased.

To allow a purchase of usage by the user at the interactive image display system 10, a payment accepting mechanism 28 is included to accept a payment. In a first embodiment, the payment accepting mechanism 28 includes a money-receiving mechanism, such as a coin-receiving mechanism and/or a currency-receiving mechanism, for directly receiving money in the form of coins and/or currency. The amount of the money received is determined by the coin-receiving and/or the currency-receiving mechanism, and is communicated to the accounting system 26 in the form of the payment parameter.

In a second embodiment, the payment accepting mechanism 28 includes a token-receiving mechanism which receives prepaid tokens, such as those commonly used in video arcades. The token-receiving mechanism counts the number of tokens received, and communicates the number to the accounting system 26.

In a third embodiment, the payment accepting mechanism 28 includes a card reader which reads a magnetic strip on a credit card or a debit card. The user can swipe his/her credit card, for example, through the card reader to purchase usage of the interactive image display system. The card reader communicates the credit card-number to the accounting system 26. The accounting system 26 performs steps of verifying the credit card by communicating with a financial network (not specifically illustrated), and billing the user at the completion of his/her sessions.

The interactive image display system 10 further includes a controller 30 operatively associated with the accounting system 26 and at least one of the user interface 16, the image processor 22, the receiver 12, and the display device 24. The controller 30 selectively inhibits an operative feature provided by the at least one of the user interface 16, the image processor 22, the receiver 12, and the display device 24 based upon the usage parameter. Optionally, the controller 30 selectively inhibits the operative feature further based upon the payment parameter.

In a preferred embodiment, the controller 30 is utilized to provide the operative feature until the usage parameter crosses a threshold dependent upon the payment parameter. Once the threshold is crossed, the controller 30 inhibits the operative feature until a subsequent payment is made by the user using the payment accepting mechanism 28. The controller 30 can include the same microprocessor and memory utilized to form the accounting system 26.

Examples of operative features of the interactive image display system 10 include: a capability to select the wide-angle image sequence from a plurality of wide-angle image sequences, a capability to select a portion of the wide-angle image sequence, a capability to communicate with the distribution system 14, a capability to display the perspective corrected image sequence, and a capability to process the portion of the wide-angle image sequence. The controller 30 can be utilized to inhibit one or more of the above-described operative features.

Embodiments of the interactive image display system 10 can be incorporated into a kiosk or a booth to provide an interactive image display apparatus. The interactive image display apparatus can be located for public use, such as in a video arcade, a shopping mall, or an amusement park.

Figure 2:
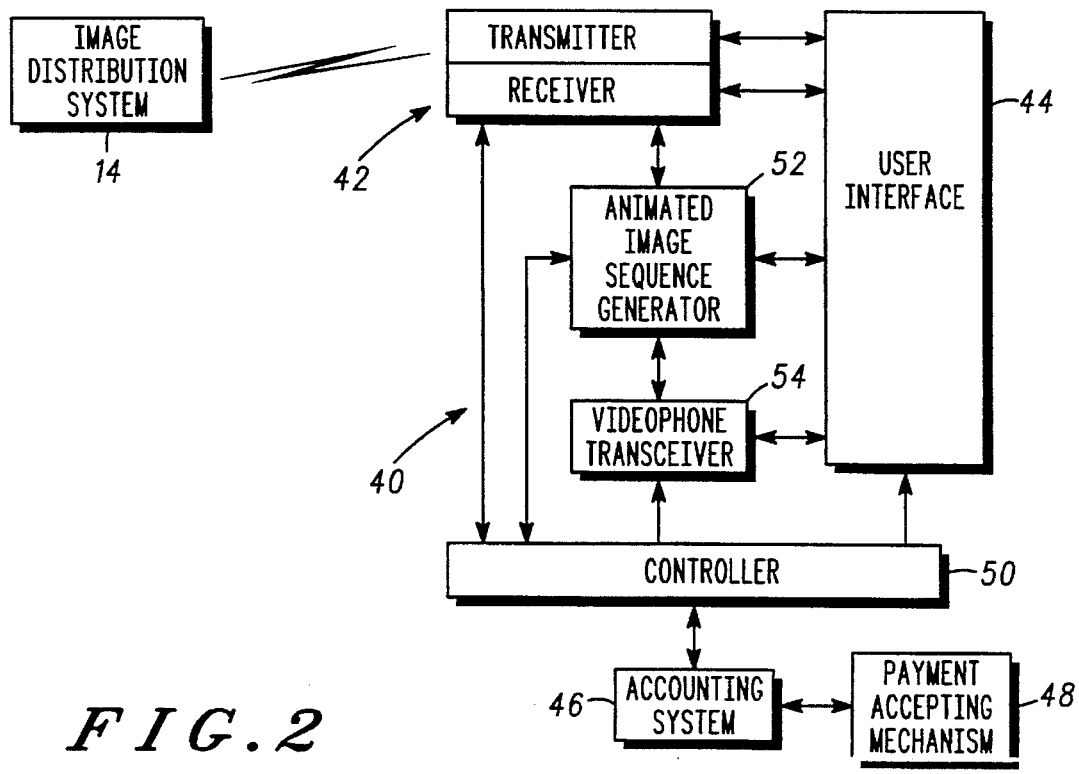
FIG. 2 is a block diagram of another embodiment of an interactive image display system.

FIG. 2 is a block diagram of another embodiment of an interactive image display system 40. As with the embodiment of FIG. 1, the interactive image display system 40 includes a transceiver 42, a user interface 44, an accounting system 46, a payment-accepting mechanism 48, and a controller 50. However, the embodiment of FIG. 2 includes an animated image sequence generator 52 in place of the image processor 22, and a videophone transceiver 54 in place of the display device 24.

The animated image sequence generator 52 produces an animated image sequence having an animated character within a perspective corrected image sequence. The perspective corrected image sequence, which is formed by a portion of a wide-angle image sequence, is generated by an image processor either within the animated image sequence generator 52 or at the image distribution system 14. The animated character has at least one graphical body member which moves in dependence upon a corresponding at least one body member of the user. Embodiments of the animated image sequence generator 52 are disclosed in the copending application, "Method and System for Producing an Animated Image Sequence using Wide-Angle Images".

The animated image sequence is provided to the videophone transceiver 54. The videophone transceiver 54 is used to communicate the animated image sequence to a remotely-located videophone transceiver (not specifically illustrated). The videophone transceiver 54 includes a display device (not specifically illustrated) for displaying the animated image sequence and for displaying images received from the remotely-located videophone transceiver. An audio input device and an audio output device (not specifically illustrated) are also included in the videophone transceiver 54 for two-way audio communication with the remotely-located videophone transceiver. Optionally, the videophone transceiver 54 includes a camera for capturing images of the user for incorporation within the perspective corrected image sequence.

The above-described embodiments can be utilized to provide a videophone booth wherein the user purchases a videophone call having either his/her image or an animated character superimposed on a real-time feed from somewhere on the earth. Here, it is preferred that the animated character have a graphical mouth which opens and closes in response to speech received by the audio input device. Alternatively, the videophone transceiver 54 can be replaced by a display device for the purpose of allowing a user to interactively view performance animation.

The usage parameter which is monitored by the accounting system 46 can include a measure of utilization of the videophone transceiver 54 in addition those described for the embodiment of FIG. 1. Additional operative features which can be inhibited by the controller 50 in this embodiment include: a capability to communicate using the videophone transceiver 54, and a capability to produce the animated character within the perspective corrected image sequence.

FIG. 3 is a block diagram of an embodiment of an image distribution system 60 for use with embodiments of the interactive image display system. The image distribution system 60 includes a receiver 62 which receives a plurality of wide-angle image sequences 64. The plurality of wide-angle image sequences 64 are captured from a plurality of viewpoints, preferably selected from the group consisting of a space viewpoint, a terrestrial viewpoint, and an undersea viewpoint.

The space viewpoint provides an aerial view of a portion of the earth from space. Preferably, the space viewpoint originates from a camera located on a spacecraft, such as a satellite which orbits the earth. Alternatively, the space viewpoint can originate from a camera located on a celestial body such as a planet or a moon, or from an aircraft in flight.

The terrestrial viewpoint provides a view of a portion of the earth from a generally land-level perspective. The terrestrial viewpoint originates from a camera located near the surface of the earth. The camera can be located within a building, such as the Capitol Building or the United Nations General Assembly, to provide a view of occurrences therein. Alternatively, the camera for a terrestrial viewpoint can be located outside, such as on top of a building or on a tower, to provide a view of occurrences outdoors.

The undersea viewpoint provides a view of a portion of the earth from below the surface of a body of water. The undersea viewpoint originates from a camera located under the surface of the body of water. The camera can be affixed to an existing natural structure in the body of water, such as a coral reef, or to a man-made structure such as a platform, a ship, or a submarine.

These viewpoints can be captured live, such as realtime image sequences 66. Alternatively, these viewpoints could be captured to form a knowledge base 68 which includes a sequence of images stored in an analog format such as on video tape or film, or in a digital format on a mass storage device such as a tape, disk, CD-ROM, or memory.

It is preferred that each of the wide-angle image sequences has a portion or all (i.e. a subset) of a spherical field of view. The angular field of view is preferably greater than 50 degrees, and more preferably, is greater than 120 degrees. In exemplary embodiments, the angular field of view is at least hemispherical. Further, it is preferred that all of a plurality of objects in the field of view are substantially in focus. These properties can be produced, for example, using a fisheye lens as an optical element in the cameras. However, many other wide-angle lenses using either traditional optics or holographic elements are also suitable for this application.

The image distribution system 60 further includes a plurality of transceivers 70 in communication with the receiver 62. The transceivers 70 are operative in transmitting image signals to a plurality of interactive image display systems 72. In particular, each of the interactive image display systems 72 communicates a first selection signal indicative of a selected one of the plurality of wide-angle image sequences. The first selection signal is received by a corresponding one of the transceivers 70, and relayed to the receiver 62 to select the selected one of the wide-angle image sequences. In response thereto, the selected one of the wide-angle image sequences is transmitted to the interactive image display system via the corresponding one of the transceivers 70. As a result, each interactive image display system 72 is capable of accessing its own selected wide-angle image sequence.

FIG. 4 is a block diagram of an alternative embodiment of an image distribution system 80 for use with embodiments of the interactive image display system. As with the embodiment of FIG. 3, the image distribution system 80 includes a receiver 82 and a plurality of transceivers 84. Further included are a plurality of image processors 86 operatively associated with the receiver 82 and the transceivers 84.

In addition to receiving the first selection signal, the transceivers 84 each further receive a second selection signal indicative of the portion of the wide-angle image sequence from which the perspective corrected image sequence is to be formed. Each of the transceivers 84 relays the second selection signal to a corresponding one of the image processors 86. Next, each of the image processors 86 produces an image signal representative of the perspective corrected image sequence of the portion of the wide-angle image sequence. Each image signal is transmitted to each of the interactive image display systems 88 by a corresponding one of the transceivers 84.

By producing the perspective corrected image sequences at the image distribution system 80 rather than at each of interactive image display systems 88, less bandwidth is required in communicating images to the interactive image display systems 88.

Embodiments of the interactive image display system can be utilized in a variety of different applications. The interactive image display apparatus can be utilized as a video arcade or amusement park attraction which allows a user to view real-time, real-world feeds from around the world. Also, as previously described, embodiments of the present invention can be utilized within a videophone booth to enhance the visual portion of a videophone conversation.

Although not specifically illustrated, each interactive image display apparatus can also include a mass storage device, such as a CD-ROM, having prestored wide-angle images and textual data thereon. The prestored wide-angle images can be selected by the user in addition to, or in place of, the wide-angle image sequences at the image distribution system. The textual data can be utilized to augment the perspective corrected images displayed on the display device.

Thus, there has been described herein a concept, as well as several embodiments including preferred embodiments of an an interactive image display apparatus.

Because the various embodiments of the interactive image display apparatus are self-contained units which can be located at a shopping mall, video arcade, or amusement park, they provide a significant improvement in broadening the access to interactive television in general, and more specifically to live real-world wide-angle feeds and animated character generation.

Additionally, the various embodiments of the present invention as herein-described use an animated image sequence generator and a videophone transceiver to provide a videophone apparatus capable of transmitting animated image sequences with a background of a distant, real-world environment.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

We claim:

1. An interactive image display system for use with an image distribution system located remotely therefrom, the interactive image display system comprising:
    a user interface to select a wide-angle image sequence from a plurality of wide-angle image sequences and to select a portion of the wide-angle image sequence;
    a transceiver operatively associated with the user interface to transmit a first selection signal and a second selection signal to the image distribution system, the first selection signal indicative of the-wide-angle image sequence, the second selection signal indicative of the portion of the wide-angle image sequence, the transceiver operative to receive an image signal from the image distribution system, the image signal representative of a perspective corrected image sequence of the portion of the wide-angle image sequence; and
    a display device operatively associated with the transceiver to display the perspective corrected image sequence.

2. The interactive image display system of claim 1 further comprising an accounting system which monitors a usage parameter representative of usage of the interactive image display system.

3. The interactive image display system of claim 2 wherein the usage parameter is based upon at least one of a measure of time elapsed during a session, a measure of computational resources utilized during a session, and a measure of information communicated with the image distribution system.

4. The interactive image display system of claim 2 further comprising a controller responsive to the accounting system which selectively inhibits an operative feature provided by at least one of the user interface, the transceiver, and the display device based upon the usage parameter.

5. The interactive image display system of claim 4 wherein the operative feature includes at least one of a capability to select the portion of the wide-angle image sequence, a capability to display the perspective corrected image sequence, and a capability to process the portion of the wide-angle image sequence.

6. The interactive image display system of claim 4 further comprising a payment accepting mechanism to accept a payment in at least one form, wherein the accounting system monitors a payment parameter based upon the payment accepted by the payment accepting mechanism.

7. The interactive image display system of claim 6 wherein the controller selectively inhibits the operative feature based upon the payment parameter.

8. The interactive image display system of claim 6 wherein the payment accepting mechanism includes a money-receiving mechanism.

9. The interactive image display system of claim 6 wherein the payment accepting mechanism includes a token-receiving mechanism.

10. The interactive image display system of claim 6 wherein the payment accepting mechanism includes a card reader.

11. The interactive image display system of claim 1 wherein the wide-angle image sequence provides a live view of an environment.

12. The interactive image display system of claim 1 wherein the wide-angle image sequence has a subset of a spherical field of view greater than 120 degrees.

13. The interactive image display system of claim 1 wherein the second selection signal includes a representation of a viewing angle for the portion of the wide-angle image sequence.

14. The interactive image display system of claim 1 wherein the second selection signal includes a representation of a magnification for the portion of the wide-angle image sequence.

15. An interactive image display system comprising:
    a user interface to select a wide-angle image sequence from a plurality of wide-angle image sequences and to select a portion of the wide-angle image sequence, the wide-angle image sequence providing a live view of an environment, the wide-angle image sequence having a subset of a spherical field of view greater than 120 degrees;
    a transceiver operatively associated with the user interface to transmit a first selection signal and a second selection signal to an image distribution system located remotely therefrom, the first selection signal indicative of the wide-angle image sequence, the second selection signal indicative of the portion of the wide-angle image sequence, the transceiver operative to receive an image signal from the image distribution system, the image signal representative of a perspective corrected image sequence of the portion of the wide-angle image sequence; and
    a display device operatively associated with the transceiver to display the perspective corrected image sequence;
    a payment accepting mechanism to accept a payment in at least one form;
    an accounting system which monitors a usage parameter based upon at least one of a measure of time elapsed during a session, a measure of computational resources utilized during a session, and a measure of information communicated with the image distribution system, the accounting system further monitoring a payment parameter based upon the payment accepted by the payment accepting mechanism; and
    a controller operatively associated with the accounting system which selectively inhibits an operative feature provided by at least one of the user interface, the transceiver, and the display device based upon the usage parameter.

* * * * *